(12) United States Patent
Codrescu et al.

(10) Patent No.: US 7,676,647 B2
(45) Date of Patent: Mar. 9, 2010

(54) SYSTEM AND METHOD OF PROCESSING DATA USING SCALAR/VECTOR INSTRUCTIONS

(75) Inventors: Lucian Codrescu, Austin, TX (US); Erich Plondke, Austin, TX (US); Taylor Simpson, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 11/506,584

(22) Filed: Aug. 18, 2006

(65) Prior Publication Data

US 2008/0046683 A1 Feb. 21, 2008

(51) Int. Cl.
*G06F 15/00* (2006.01)
(52) U.S. Cl. .............................. 712/2; 712/3; 712/233
(58) Field of Classification Search ..................... 712/2, 712/3, 233, 234
See application file for complete search history.

(56) References Cited

U.S. PATENT DOCUMENTS

| | | | | |
|---|---|---|---|---|
| 4,780,811 | A | | 10/1988 | Aoyama et al. |
| 5,086,498 | A | * | 2/1992 | Tanaka et al. ............... 709/236 |
| 5,778,241 | A | | 7/1998 | Bindloss et al. |
| 5,802,375 | A | * | 9/1998 | Ngo et al. .................... 717/160 |
| 6,035,390 | A | * | 3/2000 | Burns et al. .................. 712/220 |
| 6,237,085 | B1 | * | 5/2001 | Burns et al. .................. 712/223 |
| 6,499,097 | B2 | * | 12/2002 | Tremblay et al. ........... 712/204 |
| 6,839,828 | B2 | * | 1/2005 | Gschwind et al. ............. 712/20 |
| 6,871,298 | B1 | * | 3/2005 | Cavanaugh et al. ........... 714/33 |
| 7,089,402 | B2 | * | 8/2006 | Tanaka ......................... 712/24 |
| 7,136,989 | B2 | * | 11/2006 | Ishii .............................. 712/23 |
| 7,263,109 | B2 | * | 8/2007 | Ternovsky ................... 370/503 |
| 7,366,874 | B2 | * | 4/2008 | Seong et al. ................... 712/24 |
| 2002/0016906 | A1 | * | 2/2002 | Tremblay et al. ........... 712/204 |
| 2003/0065905 | A1 | * | 4/2003 | Ishii .............................. 712/23 |
| 2003/0110201 | A1 | * | 6/2003 | Tanaka ......................... 709/102 |
| 2003/0154358 | A1 | * | 8/2003 | Seong et al. ................... 712/24 |
| 2003/0169755 | A1 | * | 9/2003 | Ternovsky ................... 370/412 |
| 2005/0219422 | A1 | * | 10/2005 | Dorojevets et al. .......... 348/719 |
| 2005/0251644 | A1 | | 11/2005 | Maher et al. |
| 2006/0095732 | A1 | * | 5/2006 | Tran et al. .................... 712/217 |

OTHER PUBLICATIONS

Free Online Dictionary of Computing. www.foldoc.org search terms: multithreading, pipeline.*
International Preliminary Report on Patentability-PCT/US07/076033, The International Bureau of WIPO, Geneva Switzerland-Feb. 24, 2009.
International Search Report-PCT/US07/076033, International Search Authority-European Patent Office-Dec. 21, 2007.
Written Opinion-PCT/US07/076033, International Search Authority-European Patent Office-Dec. 21, 2007.

* cited by examiner

*Primary Examiner*—Aimee J Li
(74) *Attorney, Agent, or Firm*—Nicholas J. Pauley; Peter Kamarchik; Sam Talpalatsky

(57) ABSTRACT

A processor device is disclosed that includes a register file with a combined condition code register for scalar and vector operations. The processor device utilizes the combined condition code register for scalar and vector operations. Further, a compare operation can store resulting bits in the combined condition code register and a conditional operation can utilize the combined condition code register bits for evaluating a condition.

32 Claims, 10 Drawing Sheets

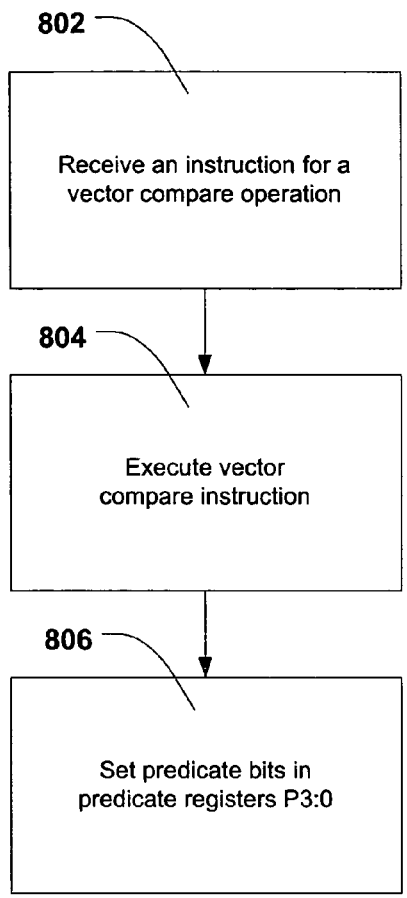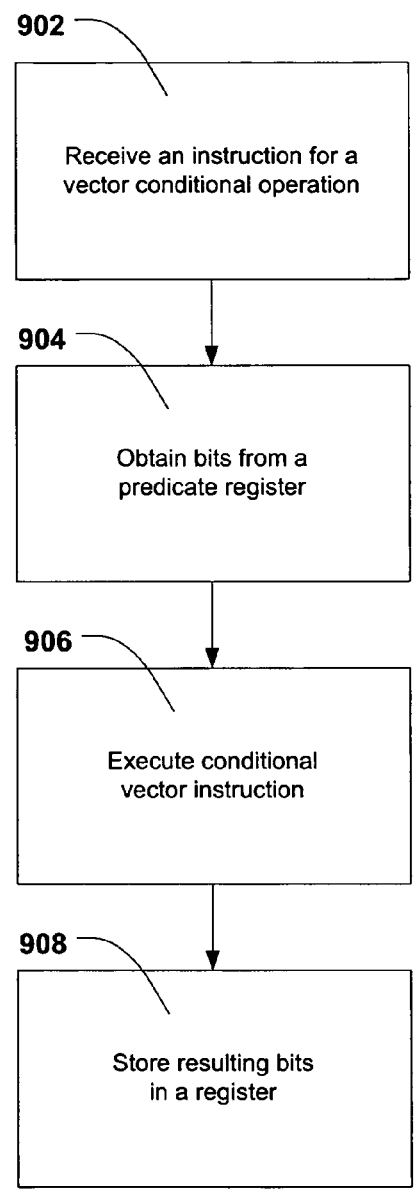
FIG. 8
FIG. 9

SYSTEM AND METHOD OF PROCESSING DATA USING SCALAR/VECTOR INSTRUCTIONS

BACKGROUND

I. Field

The present disclosure generally relates to systems and methods of processing data, and more particularly to systems and methods of processing vector and scalar operations.

II. Description of Related Art

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can include a web interface that can be used to access the Internet. As such, these wireless telephones include significant computing capabilities.

Typically, as these devices become smaller and more powerful, they become increasingly resource constrained. For example, the screen size, the amount of available memory and file system space, and the amount of input and output capabilities may be limited by the small size of the device. Further, the battery size, the amount of power provided by the battery, and the life of the battery is also limited. One way to increase the battery life of the device is to design less power consuming processors.

Certain types of processors employ a vector architecture for vector processing. Processors with a vector architecture provide high-level operations that work on vectors, i.e. linear arrays of data. Vector processing fetches an instruction once and then executes the instruction multiple times with different data. This allows the energy required to execute a program to be reduced because, among other factors, each instruction needs to be fetched fewer times. In addition, processors with a vector architecture usually allow multiple operations to be done at the same time, creating parallelism among the operations.

On the other hand, other types of processors employ a scalar architecture for scalar processing. Scalar processing fetches the instruction and data each time the instruction is executed. In executing a loop that requires an instruction be executed multiple times, a processor with a scalar architecture will fetch the instruction multiple times.

Vector processing is desirable for tasks that require the same operation to be performed on a large set of data. However, a processor with a vector architecture does not take into account scalar conditions or yield a scalar result. Scalar operations are useful when a processor has a linear scaling performance requirement, as in a video device expected to handle multiple video streams. For this reason, existing processors use a scalar architecture for multi-media processing. Due to the lack of parallelism, this approach requires the processor to run very quickly which is inefficient in terms of power consumption.

Accordingly, it would be advantageous to provide an improved processing system and method of processing vector operations that takes into account scalar conditions.

SUMMARY

A processor device is disclosed and includes a control register including a combined condition code register for scalar and vector operations and at least one instruction execution unit to execute scalar and vector instructions that both utilize the combined condition code register.

In a particular embodiment, the processor device includes a memory unit and a sequencer responsive to the memory unit. The instruction execution unit is responsive to the sequencer. Further, in yet another particular embodiment, the processor device includes a memory unit with an instruction for a scalar operation that utilizes the combined condition code register and an instruction for a vector operation that utilizes the combined condition code register. In still another embodiment, the processor device includes a scalar compare operation. In another embodiment, the processor device includes a vector compare operation.

In still another embodiment, the processor device includes a scalar operation that is conditionally executed based on the combined condition code register. In another embodiment, the processor device includes a scalar operation that uses the combined condition code register as an input.

In yet another embodiment, the processor device includes a vector operation that is conditionally executed based on a result in the combined condition code register. In a particular embodiment, the processor device includes a vector compare operation that uses the combined condition code register to store a result of the vector compare operation.

In a particular embodiment, the processor device includes instruction execution units that perform operations on bytes, half words, words, and double words.

An advantage of one or more of the embodiments disclosed herein can include substantially improving the performance of the processor device. Another advantage can include providing lower power usage for the processor device.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the advantages of the embodiments described herein will become more readily apparent by reference to the following detailed description when taken in conjunction with the accompanying drawings wherein:

FIG. 8 is a flow diagram of a method of executing a vector operation;

FIG. 9 is a flow diagram of a method of executing a vector conditional operation;

DETAILED DESCRIPTION

Figure 1:
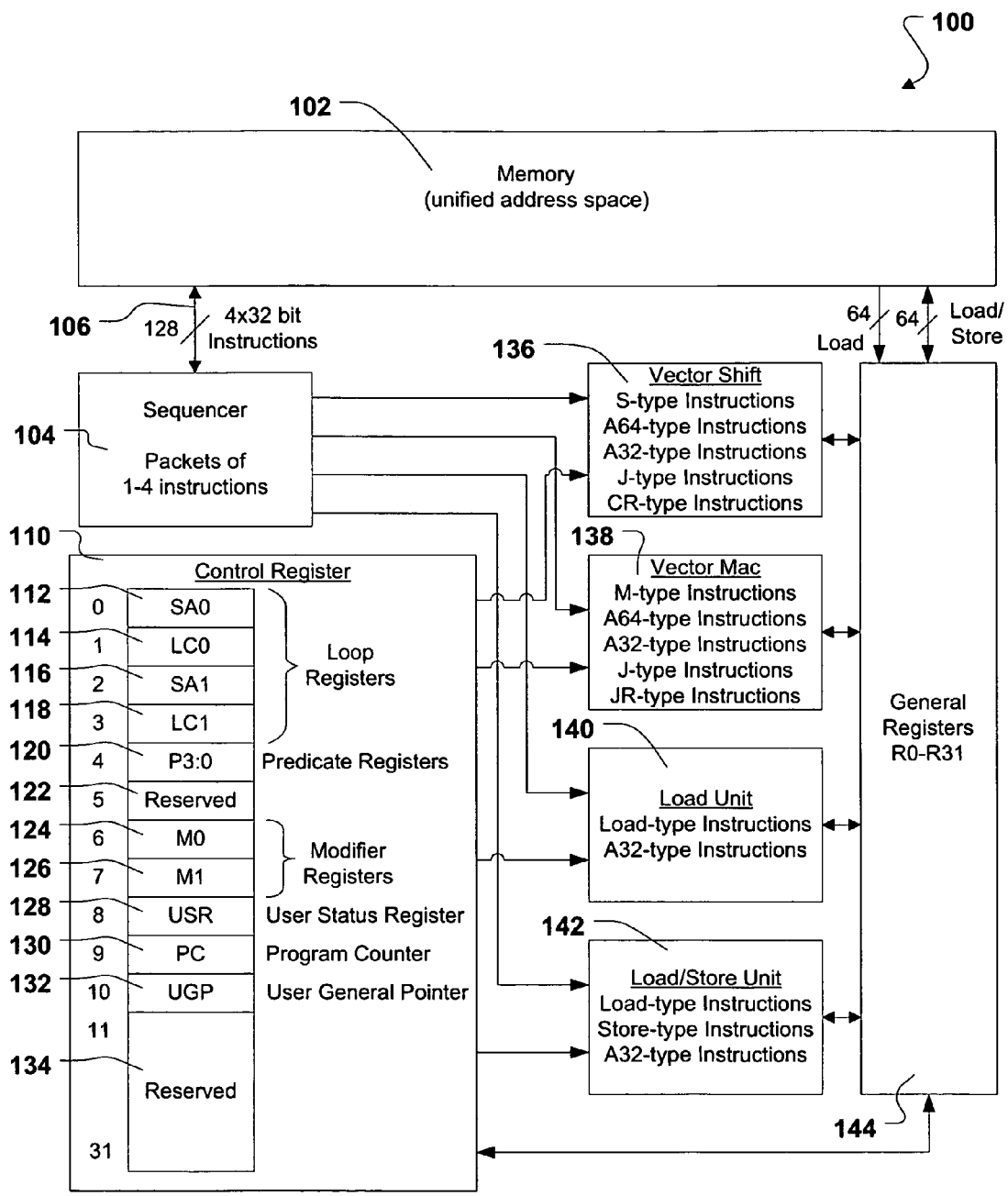
FIG. 1 is a block diagram of an exemplary digital signal processor.

FIG. 1 illustrates a block diagram of an exemplary, non-limiting embodiment of a processor 100. In a particular embodiment, the processor 100 is a digital signal processor (DSP), such as a general purpose DSP for high-performance and low-power across a wide variety of signal, image, and video processing applications.

In a particular embodiment, the processor 100 combines a scalar instruction set with a DSP oriented instruction set. In such an embodiment, the processor 100 includes a complete and orthogonal scalar instruction set, similar to a Reduced Instruction Set Computer (RISC) instruction set, that provides operations on fixed-point data. The scalar instructions are designed to be orthogonal and RISC-like in order to achieve greater flexibility and performance. In addition, the processor 100 includes a vector instruction set for providing a variety of DSP operations. The combination provides a rich set of operations for signal processing applications.

In a particular embodiment, the processor 100 supports M-type operations including operations on fixed-point data, fractional scaling, saturation, rounding, single-precision, double-precision, complex, vector half-word, and vector byte operations. In a particular embodiment, the processor 100 supports S-type operations including scalar shift, vector shift, permute, bit manipulation, and predicate operations. In a particular embodiment, the processor 100 supports ALU64 operations including arithmetic logic unit (ALU), permute, vector byte, vector half-word, and vector word operations. In a particular embodiment, the processor 100 supports ALU32 operations including add, subtract, negate without saturation on 32-bit data, scalar 32-bit compares, combine half-words, combine words, shift half-words, multiplexer (MUX), no operation (Nop), sign and zero extend bytes and half words, and transfer immediates and registers. In a particular embodiment, the processor 100 supports control register operations such as control register transfer instructions.

As illustrated in FIG. 1, the processor 100 includes a memory 102 that is coupled to a sequencer 104 via a bus 106. In a particular embodiment, the memory 102 is a unified memory model. In a particular embodiment, the bus 106 is an 128-bit bus and the sequencer 104 is configured to retrieve instructions from the memory 102 having a length of 32-bits. The sequencer 104 is coupled to a first instruction execution unit 136, a second instruction execution unit 138, a third instruction execution unit 140, and a fourth instruction execution unit 142. FIG. 1 indicates that each instruction execution unit 136, 138, 140, 142 can be coupled to a general register file 144. The general register file 144 can also be coupled to a control register file 110 and to the memory 102.

In a particular embodiment, the general register file 144 is a single unified register file that holds thirty-two (32) 32-bit registers which can be accessed as single registers, or as aligned 64-bit pairs. In a particular embodiment, the general register file 144 holds pointer, scalar, vector, and accumulator data. The general register file 144 can be used for general-purpose computation including address generation, scalar arithmetic, and vector arithmetic. In a particular embodiment, the general register file provides operands for instructions, including addresses for load/store, data operands for numeric instructions, and vector operands for vector instructions.

In a particular embodiment, the memory 102 is a unified byte-addressable memory that has a single 32-bit address space that holds both data and instructions and operates in Little Endian Mode, where the lowest address byte in memory is held in the least significant byte of a register. During operation, the sequencer 104 can fetch instructions from the memory 102.

During operation of the processor 100, instructions are fetched from the memory 102 by the sequencer 104, sent to designated instruction execution unit 136, 138, 140, 142, and executed at the instruction execution unit 136, 138, 140, 142. The instructions can include scalar and vector instructions, e.g. scalar and vector compare operations, scalar conditional operations, and vector multiplexer operations. In a particular embodiment, the sequencer 104 can fetch four 32-bit instructions at one time and issue the four instructions in parallel to the instruction execution units 136, 138, 140, 142. Instructions can be grouped for parallel execution into packets of one to four instructions of various types. Packets of varying length can be freely mixed in a program. The results of each instruction execution unit 136, 138, 140, 142 can be written to the general register file 144. In a particular embodiment, the processor 100 supports moving two 64-bit double words from memory to registers each cycle.

In a particular embodiment, the processor 100 has a load/store architecture that features a complete set of addressing modes tailored to both compiler needs and DSP application needs. Linear, circular buffers, and bit reversed addressing can be supported. Loads and stores can be signed or unsigned to bytes (8-bit), half words (16-bit), words (32-bit), and double words (64-bit). In a particular embodiment, the processor 100 supports two parallel loads or one load and one store in parallel.

In a particular embodiment, the instruction execution unit 136 is a vector shift/permute/arithmetic logic unit (ALU) unit; instruction execution 138 is a vector multiplication/ALU unit; instruction execution 140 is a load/ALU unit; and instruction execution unit 142 is a Load/Store/ALU unit.

In a particular embodiment, a set of 32-bit control registers provide access to special-purpose features. The control registers can be logically grouped into a single control register file, such as control register file 110. These control registers can include a combined predicate register, such as predicate registers 120, that can hold the result of scalar and vector operations. A predicate register is synonymous with a condition code register. The control register file 110 can also include loop registers 112, 114, 116, 118, modifier registers 124, 126, a user status register (USR) 128, a program counter (PC) register 130, and a user general pointer register 132. In a particular embodiment, the control register file 110 includes reserved registers, such as reserved registers 122 and 134. In a particular embodiment, instructions are available to transfer registers between the control register file 110 and the general register file 144. In a particular embodiment, predicate registers 120 are four 8-bit predicate registers.

In a particular embodiment, compare instructions, as described below with respect to FIG. 6 and FIG. 8, can set bits in the predicate registers 120. The compare instructions can store the results of a compare operation in the predicate registers 120. In a particular embodiment, the compare instructions include vector and scalar compare instructions. Scalar compare instructions are available in both compare-to-immediate and register-register compare forms.

Figure 7:
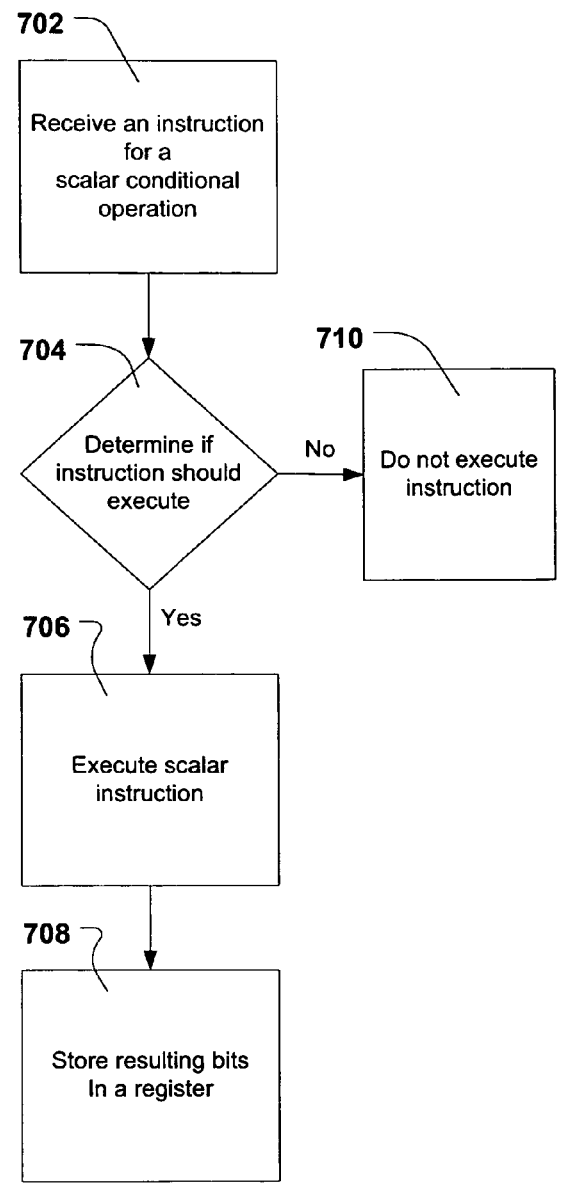
FIG. 7 is a flow diagram of a method of executing a scalar conditional operation.

In a particular embodiment, the bits stored in the predicate registers 120 can be used to conditionally execute certain instructions, as described with respect to FIG. 7 and FIG. 8. In a particular embodiment, the results of a compare instruction are stored in one of the predicate registers 120 and are then used as conditional bits for a conditional instruction. For example, vector instructions such as branch instructions and multiplexer (MUX) instructions are the primary consumers of the predicate registers 120. However, certain scalar instructions can also use the bits stored in the predicate registers 120 as conditional bits. In a particular embodiment, scalar operations that use the predicate registers 120 only examine the least-significant bit while the vector operations inspect more bits.

For example, in a particular embodiment, instructions such as jump-to-address, jump-to-address-from-register, call-sub-routine, and call-sub-routine-from-register use the bits stored in the predicate registers 120. The jump-to-address instruction and the jump-to-address-from-register instruction are used to change program flow. The call-subroutine instruction and the call-subroutine-from-register instruction are used to change the program flow to a subroutine.

In a particular embodiment, the processor 100 has a set of instructions to manipulate and move the predicate registers 120. The instructions include logical instructions including AND, OR, NOT, and XOR. In addition, further instructions included are logical-reductions-on-predicates. A first logical-reductions-on-predicates instruction sets the predicate destination register to 0xff if any of the low 8 bits in the source predicate register are set, otherwise the destination predicate is set to 0x00. Another instruction sets the predicate destination register to 0xff if all of the low 8 bits in the source predicate register are set, otherwise the destination predicate is set to 0x00.

In a particular embodiment, the processor 100 supports zero-overhead hardware loops. There are two sets of nestable loop machines with very few restrictions on use. Software branches work through a predicated branch mechanism. Explicit compare instructions generate a predicate bit. The generated bit is used by conditional branch instructions. Conditional and unconditional jumps, and subroutine calls are supported in both PC-relative and register indirect form.

In a particular embodiment, the processor 100 supports pipelining, where the processor 100 begins executing a second instruction before the first has been completed.

Figure 2:
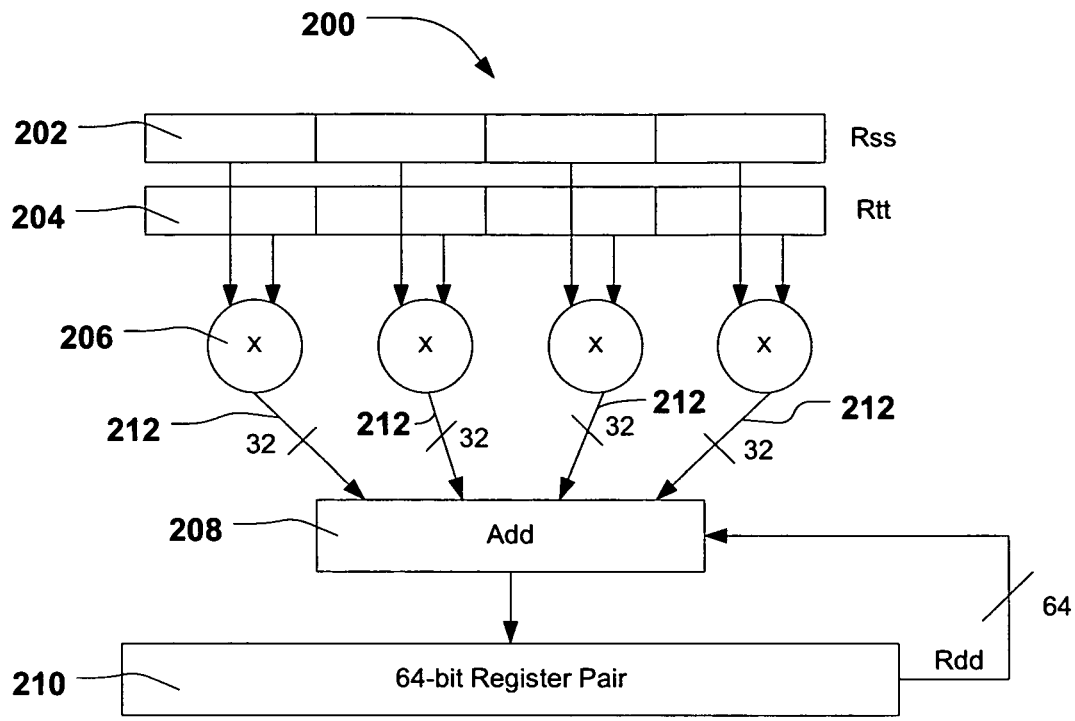
FIG. 2 is a general diagram of an exemplary instruction.

FIG. 2 illustrates a diagram of an exemplary instruction that may be executed by the processor 100, a vector reduce multiply half-words instruction 200. As illustrated in FIG. 2, a half-word (not shown) of a first 64-bit vector 202 and a half-word (not shown) of a second 64-bit vector 204 are multiplied at 206. The intermediate products 212 are then added together at 208. The full 64-bit result is stored in a destination register 210. In a particular embodiment, the 64-bit result stored in the destination register 210 is optionally added at 208. The instruction 200 can be executed by an instruction execution unit 138. In a particular embodiment, the execution unit 138 is a vector multiply-accumulator (MAC) unit that supports operation on single precision (16×16), double precision (32×32 and 32×16), vector, and complex data. Preferably, the execution unit 138 is capable of performing a variety of DSP operations on both scalar and packed vector data. In addition, the execution unit 138 can execute instruction forms that support automatic scaling, saturation, and rounding.

Figure 3:
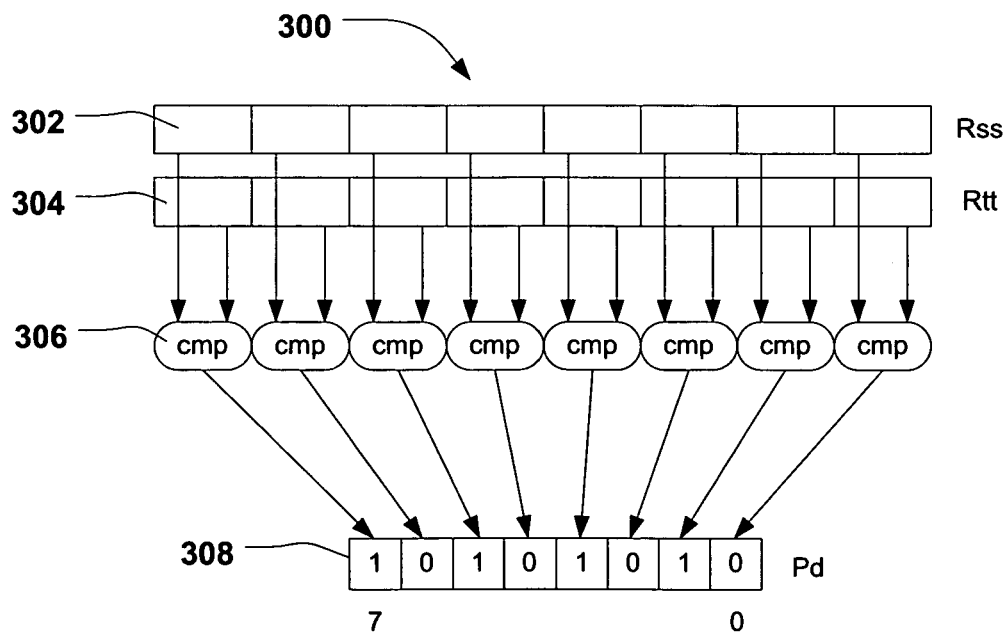
FIG. 3 is a general diagram of a vector compare instruction.

FIG. 3 illustrates a diagram of an exemplary instruction, a vector compare instruction 300, that may be executed by the processor 100. As illustrated in FIG. 3, a first 64-bit vector 302 and a second 64-bit vector 304 are compared at 306. Each element of the vector 302 and the vector 304 is compared and a bit vector of true/false results 308 is produced. Each bit of the bit vector of true/false results 308 is set to either a 0 or 1 depending on the compare outcome. In a particular embodiment, the bit vector of true/false results 308 is stored in one of the predicate registers 120.

Figure 4:
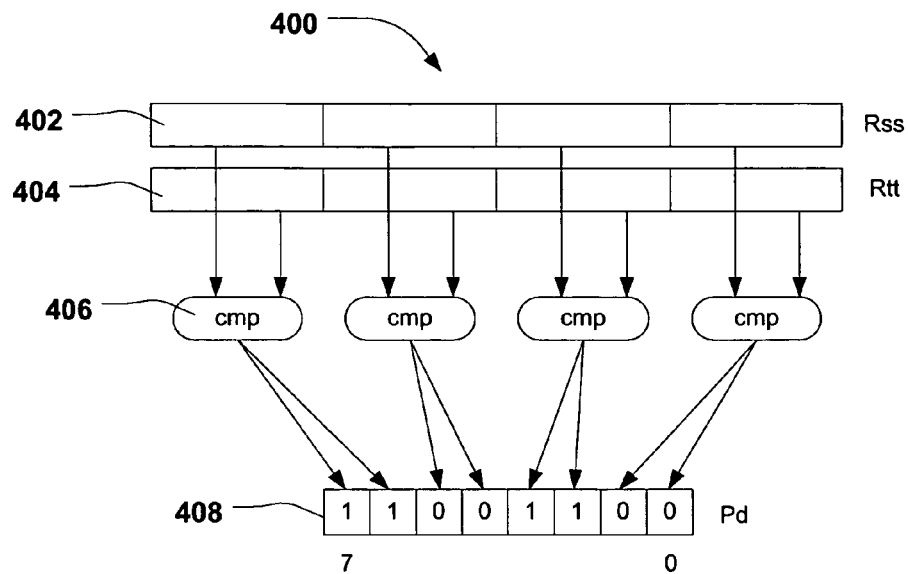
FIG. 4 is a general diagram of a vector half-word compare instruction.

FIG. 4 illustrates a diagram of an exemplary instruction that may be executed by the processor 100, a vector half-word compare instruction 400. As illustrated in FIG. 4, a half-word (not shown) of a first 64-bit vector 402 and a corresponding half-word (not shown) of a second 64-bit vector 404 are compared at 406. Each half-word of vector 402 and vector 404 is compared and a bit vector of true/false results 408 is produced. For half-word comparison, two bits of the bit vector of true/false results 408 are set to either a 0 or 1 depending on each compare outcome. In a similar manner, for word comparisons, four bits of a result vector are set to either a 0 or 1 depending on each compare outcome. In a particular embodiment, the bit vector of true/false results 408 is stored in one of the predicate registers 120.

Figure 5:
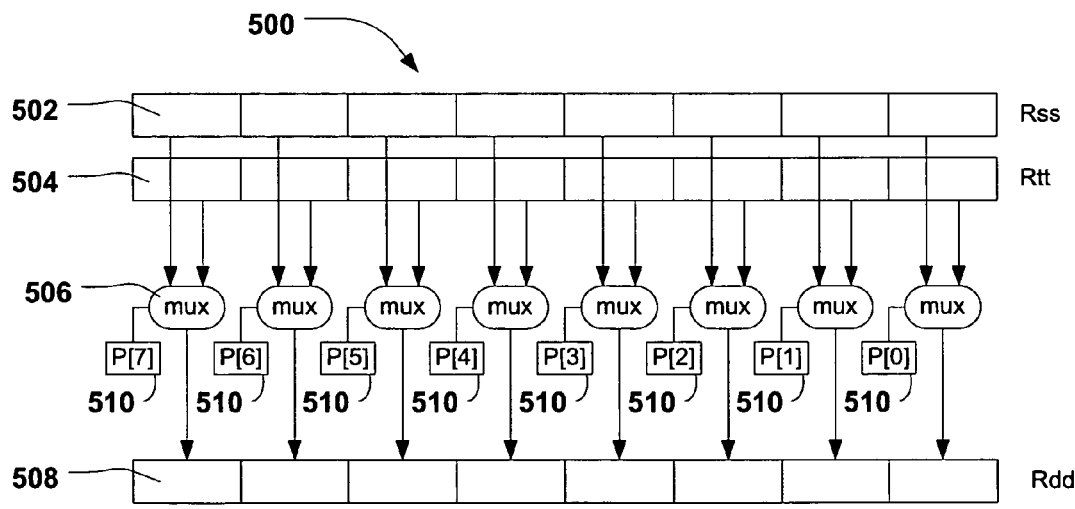
FIG. 5 is a general diagram of a vector multiplexer instruction.

FIG. 5 illustrates a diagram of an exemplary instruction, a vector MUX instruction 500, that may executed by the processor 100. As illustrated in FIG. 5, each element of a first 64-bit vector 502 and each corresponding element of a second 64-bit vector 504 are conditionally selected at 506. For each byte in vector 502 and the corresponding byte in vector 504, a corresponding bit 510 is used as a conditional bit. In a particular embodiment, bits 510 are stored in one of the predicate registers 120. The conditional bits 510 determine the result of the MUX operation. The MUX operates to select the value of the byte from either the vector 502 or the vector 504, thus performing an element-wise byte selection between two vectors. The vector MUX instruction produces a byte vector of results 508. In a particular embodiment, for each of the low 8 bits of one of the predicate registers 120, if the bit is set, then the corresponding byte of the result 508 is set to the corresponding byte from the vector 502. Otherwise, the corresponding byte of the result 508 is set to the corresponding byte from the vector 504. In a particular embodiment, the byte vector of results 508 is stored in a destination register (not shown) in general registers 144.

Figure 6:
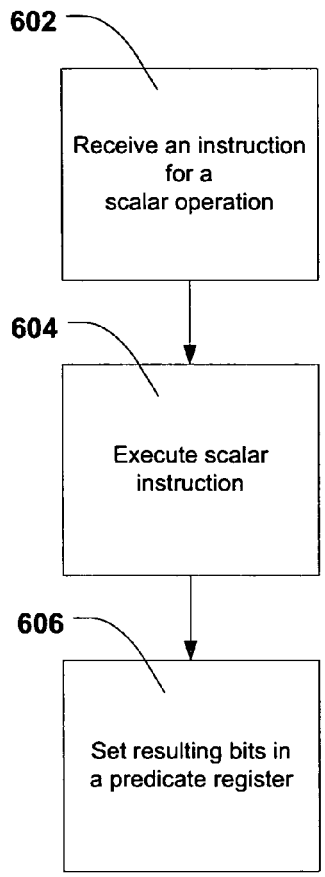
FIG. 6 is a flow diagram of a method of executing a scalar operation.

FIG. 6 illustrates a flow diagram of a method of executing a scalar operation. A scalar instruction may be received at 602 by an instruction execution unit, such as one of the instruction execution units 136, 138, 140, 142. The scalar instruction is then executed, at 604, by the instruction execution unit. The resulting bits from the instruction execution are then set, at 606, in a results register. In a particular embodiment, the resulting bits are set in one of the predicate registers 120. In a particular embodiment, the instruction is a scalar compare instruction where the scalar compare instruction sets every bit in one of the predicate registers 120 as a one (1) for a true compare and sets every bit in one of the predicate registers 120 as a zero (0) for a false compare.

FIG. 7 illustrates a flow diagram of a method of executing a scalar conditional operation. A scalar conditional instruction may be received, at 702, by an instruction execution unit, such as one of the instruction execution units 136, 138, 140, 142. The instruction execution unit determines, at 704, if the scalar conditional instruction should be executed. In a particular embodiment, the determination, at 704, is done by examining a least-significant bit in one of the predicate registers 120. If the determination is not to execute, then the scalar conditional operation is not executed, at 710. If the determination is to execute, the scalar conditional instruction is then executed, at 706, by the instruction execution unit. The resulting bits from the instruction execution are then set, at 708, in a results register.

FIG. 8 illustrates a flow diagram of a method of executing a vector operation. In a particular embodiment, the vector operation is a vector compare operation. A vector instruction may be received, at 802, by an instruction execution unit, such as one of the instruction execution units 136, 138, 140, 142. The vector instruction is then executed, at 804, by the instruction execution unit. The resulting bits from the instruction execution are then set, at 806, in a results register. In a particular embodiment, the resulting bits are set in one of the predicate registers 120.

In a particular embodiment, the processor 100 support three forms of compare operations including compare-for-equal, compare-for-signed-greater-than, and compare-for-unsigned-greater-than. These three forms are sufficient to generate all comparisons of signed and unsigned values. The output of each comparison produces a true or false value which can be used in either sense. Additionally, register operands can be reversed to produce another comparison. By swapping operands and using both senses of the result, it is possible to perform the full compliment of signed and unsigned comparisons.

FIG. 9 illustrates a flow diagram of a method of executing a vector conditional operation. In a particular embodiment, the vector conditional operation is a vector MUX operation. A vector conditional instruction may be received, at 902, by an instruction execution unit, such as instruction execution units 136, 138, 140, 142. The instruction execution unit obtains, at 904, a set of conditional bits, such as bits 510. In a particular embodiment, the obtained bits are from one of the predicate registers 120. The obtained bits are then used when the vector conditional instruction is executed, at 906, by the instruction execution unit. The resulting bits from the instruction execution are then set, at 908, in a results register. By swapping the source operands of the MUX instructions, both senses of the result can be formed.

For example, in a vector MUX operation, each byte in a first vector and the corresponding byte in a second vector are conditionally selected using a corresponding conditional bit vector. In a particular embodiment, the conditional bits are stored in one of the predicate registers 120. The MUX operates to select the value of the byte from either the first vector or the second vector, thus performing an element-wise byte selection between two vectors. The vector MUX instruction produces a byte vector of results. In a particular embodiment, for each of the low 8 bits of one of the predicate registers 120, if the bit is set, then the corresponding byte of the result is set to the corresponding byte from the first vector. Otherwise, the corresponding byte of the result is set to the corresponding byte from the second vector. In a particular embodiment, the byte vector of results is stored in a destination register (not shown) in general registers 144.

In a particular embodiment, the processor 100 uses vector conditional instructions to vectorize loops with conditional statements. For example, in a scalar instruction loop, a scalar instruction is fetched and executed for each successive iteration of the loop. In a vector conditional statement, the loop can be replaced with vector conditional operations such that the instruction is fetched once and executed on the vector. For example, the following C-code loop fetches an instruction and data eight times:

```
for (i=0; i<8; i++) {if (A[i]) {B[i]=C[i];}}.
```

This C-code loop can be replaced by two vector operations that fetch the instruction and data preferably once each. To vectorize the example C-code loop, two vector operations are executed. First, a compare operation is executed that compares the bytes in vector A to zero and the resulting bits are stored in a register, preferably one of predicate registers 120. Second, a vector MUX operation is executed that uses the result of the vector A comparison as conditional bits to select between the bytes of vector B and vector C. The results of the vector MUX operation can be stored in a register. Thus, because the instructions and data are fetched fewer times, vector conditional operations allow the processor to be faster, more efficient, and consume less power than loops with conditional statements.

Figure 10:
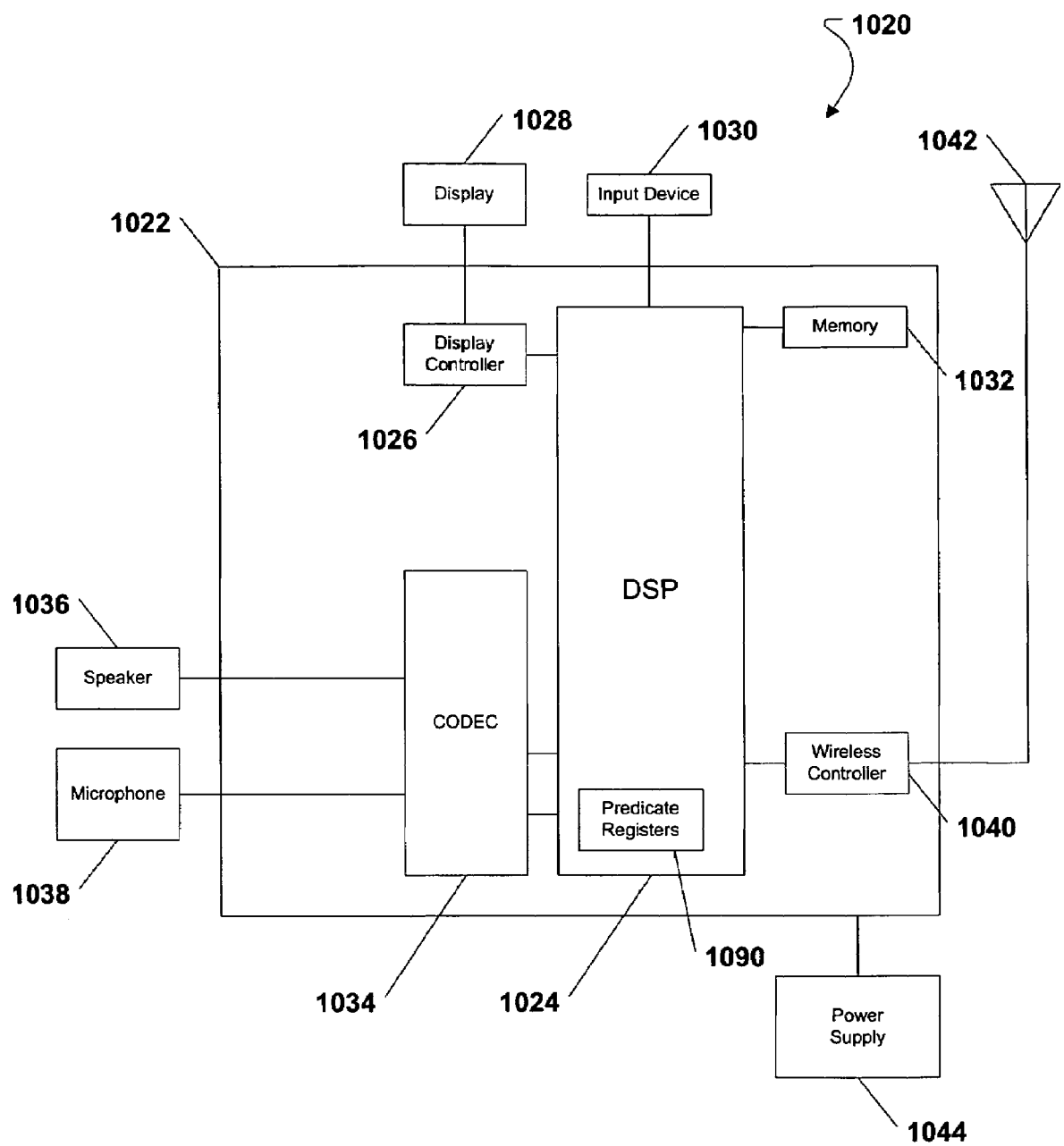
FIG. 10 is a block diagram of a portable communication device incorporating a digital signal processor.

FIG. 10 illustrates an exemplary, non-limiting embodiment of a portable communication device that is generally designated 1020. As illustrated in FIG. 10, the portable communication device includes an on-chip system 1022 that includes a digital signal processor 1024. In a particular embodiment, the digital signal processor 1024 is the processor shown in FIG. 1 and described herein. As illustrated in FIG. 10, the DSP 1024 includes a combined predicate register 1090 for scalar operations and vector operations. In a particular embodiment, compare operations store results in the combined predicate register 1090 and conditional operations use the stored compare results as conditional bits, e.g. in a vector MUX instruction as described above. FIG. 10 also shows a display controller 1026 that is coupled to the digital signal processor 1024 and a display 1028. Moreover, an input device 1030 is coupled to the digital signal processor 1024. As shown, a memory 1032 is coupled to the digital signal processor 1024. Additionally, a coder/decoder (CODEC) 1034 can be coupled to the digital signal processor 1024. A speaker 1036 and a microphone 1038 can be coupled to the CODEC 1030.

FIG. 10 also indicates that a wireless controller 1040 can be coupled to the digital signal processor 1024 and a wireless antenna 1042. In a particular embodiment, a power supply 1044 is coupled to the on-chip system 1002. Moreover, in a particular embodiment, as illustrated in FIG. 10, the display 1026, the input device 1030, the speaker 1036, the microphone 1038, the wireless antenna 1042, and the power supply 1044 are external to the on-chip system 1022. However, each is coupled to a component of the on-chip system 1022.

In a particular embodiment, the digital signal processor 1024 utilizes interleaved multithreading to process instructions associated with program threads necessary to perform the functionality and operations needed by the various components of the portable communication device 1020. For example, when a wireless communication session is established via the wireless antenna a user can speak into the microphone 1038. Electronic signals representing the user's voice can be sent to the CODEC 1034 to be encoded. The digital signal processor 1024 can perform data processing for the CODEC 1034 to encode the electronic signals from the microphone. Further, incoming signals received via the wireless antenna 1042 can be sent to the CODEC 1034 by the wireless controller 1040 to be decoded and sent to the speaker 1036. The digital signal processor 1024 can also perform the data processing for the CODEC 1034 when decoding the signal received via the wireless antenna 1042.

Further, before, during, or after the wireless communication session, the digital signal processor 1024 can process inputs that are received from the input device 1030. For example, during the wireless communication session, a user may be using the input device 1030 and the display 1028 to surf the Internet via a web browser that is embedded within the memory 1032 of the portable communication device 1020. The digital signal processor 1024 can interleave various program threads that are used by the input device 1030, the display controller 1026, the display 1028, the CODEC 1034 and the wireless controller 1040, as described herein, to efficiently control the operation of the portable communication device 1020 and the various components therein. Many of the instructions associated with the various program threads are executed concurrently during one or more clock cycles. As such, the power and energy consumption due to wasted clock cycles is substantially decreased.

Figure 11:
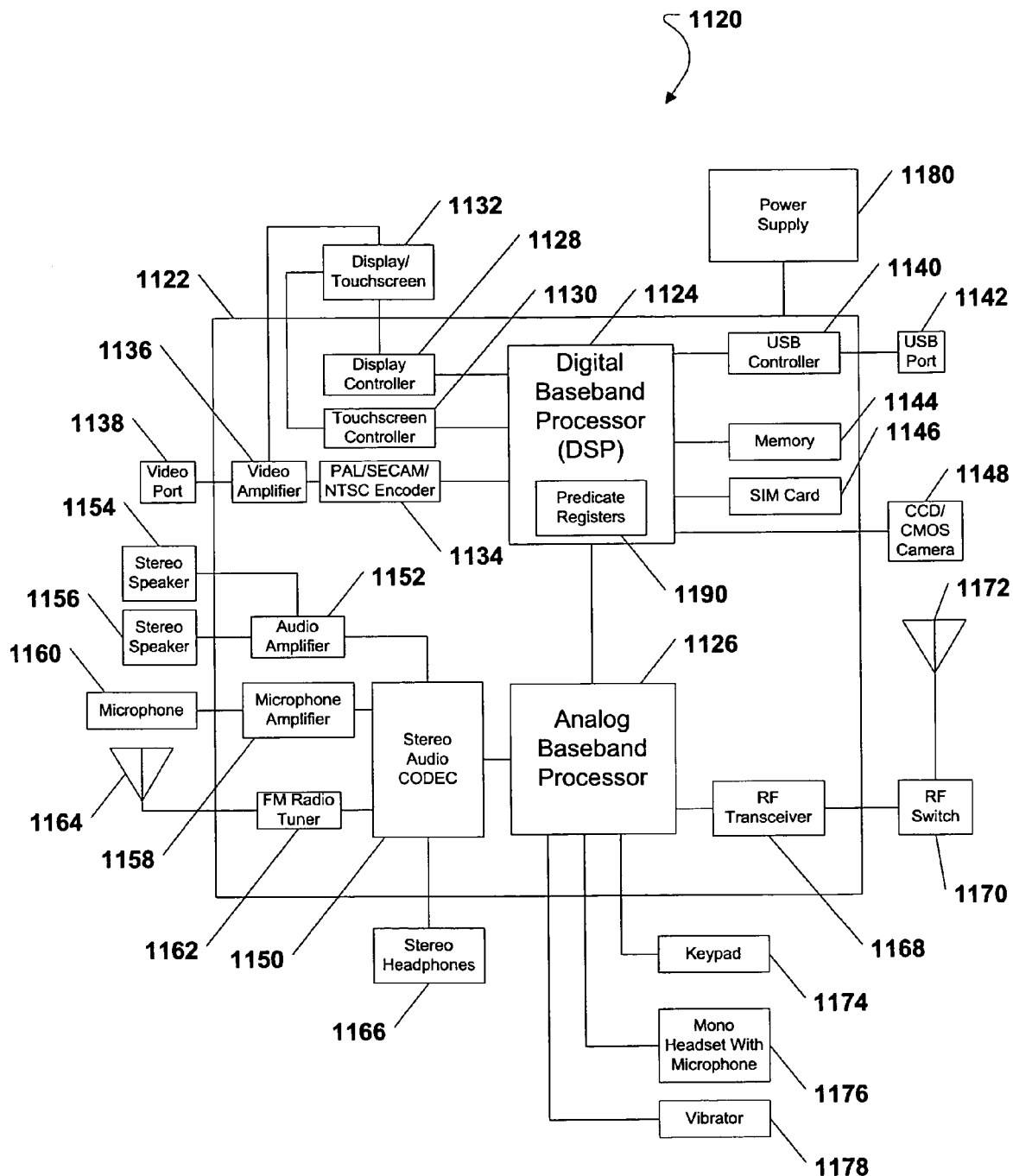
FIG. 11 is a block diagram of an exemplary cellular telephone incorporating a digital signal processor.

Referring to FIG. 11, an exemplary, non-limiting embodiment of a cellular telephone is shown and is generally designated 1120. As shown, the cellular telephone 1120 includes an on-chip system 1122 that includes a digital baseband processor 1124 and an analog baseband processor 1126 that are coupled together. In a particular embodiment, the digital baseband processor 1124 is a digital signal processor, e.g., the processor shown in FIG. 1 and described herein. As illustrated in FIG. 11, the DSP 1124 includes a combined predicate register 1190 for scalar operations and vector operations. In a particular embodiment, compare operations store results in the combined predicate register 1190 and conditional operations use the stored compare results as conditional bits, e.g. in a vector MUX instruction as described above. As indicated in FIG. 11, a display controller 1128 and a touchscreen controller 1130 are coupled to the digital baseband processor 1124. In turn, a touchscreen display 1132 external to the on-chip system 1122 is coupled to the display controller 1128 and the touchscreen controller 1130.

FIG. 11 further indicates that a video encoder 1134, e.g., a phase alternating line (PAL) encoder, a sequential couleur a memoire (SECAM) encoder, or a national television system (s) committee (NTSC) encoder, is coupled to the digital baseband processor 1124. Further, a video amplifier 1136 is coupled to the video encoder 1134 and the touchscreen display 1132. Also, a video port 1138 is coupled to the video amplifier 1136. As depicted in FIG. 11, a universal serial bus (USB) controller 1140 is coupled to the digital baseband processor 1124. Also, a USB port 1142 is coupled to the USB controller 1140. A memory 1144 and a subscriber identity module (SIM) card 1146 can also be coupled to the digital baseband processor 1124. Further, as shown in FIG. 11, a digital camera 1148 can be coupled to the digital baseband processor 1124. In an exemplary embodiment, the digital camera 1148 is a charge-coupled device (CCD) camera or a complementary metal-oxide semiconductor (CMOS) camera.

As further illustrated in FIG. 11, a stereo audio CODEC 1150 can be coupled to the analog baseband processor 1126. Moreover, an audio amplifier 1152 can coupled to the to the stereo audio CODEC 1150. In an exemplary embodiment, a first stereo speaker 1154 and a second stereo speaker 1156 are coupled to the audio amplifier 1152. FIG. 11 shows that a microphone amplifier 1158 can be also coupled to the stereo audio CODEC 1150. Additionally, a microphone 1160 can be coupled to the microphone amplifier 1158. In a particular embodiment, a frequency modulation (FM) radio tuner 1162 can be coupled to the stereo audio CODEC 1150. Also, an FM antenna 1164 is coupled to the FM radio tuner 1162. Further, stereo headphones 1166 can be coupled to the stereo audio CODEC 1150.

FIG. 11 further indicates that a radio frequency (RF) transceiver 1168 can be coupled to the analog baseband processor 1126. An RF switch 1170 can be coupled to the RF transceiver 1168 and an RF antenna 1172. As shown in FIG. 11, a keypad 1174 can be coupled to the analog baseband processor 1126. Also, a mono headset with a microphone 1176 can be coupled to the analog baseband processor 1126. Further, a vibrator device 1178 can be coupled to the analog baseband processor 1126. FIG. 11 also shows that a power supply 1180 can be coupled to the on-chip system 1122. In a particular embodiment, the power supply 1180 is a direct current (DC) power supply that provides power to the various components of the cellular telephone 1120 that require power. Further, in a particular embodiment, the power supply is a rechargeable DC battery or a DC power supply that is derived from an alternating current (AC) to DC transformer that is connected to an AC power source.

In a particular embodiment, as depicted in FIG. 11, the touchscreen display 1132, the video port 1138, the USB port 1142, the camera 1148, the first stereo speaker 1154, the second stereo speaker 1156, the microphone, the FM antenna 1164, the stereo headphones 1166, the RF switch 1170, the RF antenna 1172, the keypad 1174, the mono headset 1176, the vibrator 1178, and the power supply 1180 are external to the on-chip system 1122. Moreover, in a particular embodiment, the digital baseband processor 1124 can use interleaved multithreading, described herein, in order to process the various program threads associated with one or more of the different components associated with the cellular telephone 1120.

Figure 12:
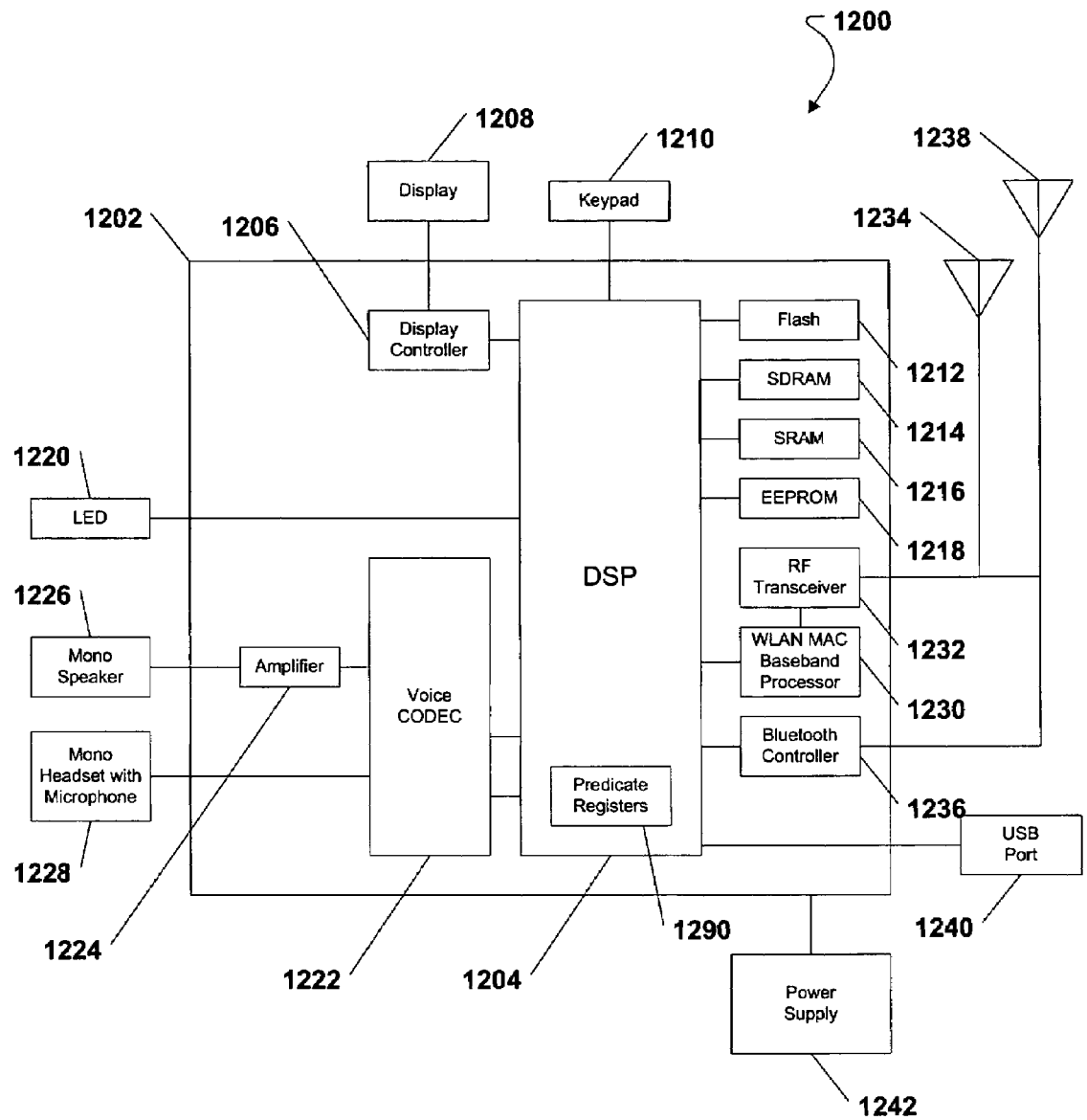
FIG. 12 is a block diagram of an exemplary wireless Internet Protocol telephone incorporating a digital signal processor.

Referring to FIG. 12, an exemplary, non-limiting embodiment of a wireless Internet protocol (IP) telephone is shown and is generally designated 1200. As shown, the wireless IP telephone 1200 includes an on-chip system 1202 that includes a digital signal processor (DSP) 1204. In a particular embodiment, the DSP 1204 is the processor shown in FIG. 1 and described herein. As illustrated in FIG. 12, the DSP 1204 includes a combined predicate register 1290 for scalar operations and vector operations. In a particular embodiment, compare operations store results in the combined predicate register 1290 and conditional operations use the stored compare results as conditional bits, e.g. in a vector MUX instruction as described above. As illustrated in FIG. 12, a display controller 1206 is coupled to the DSP 1204 and a display 1208 is coupled to the display controller 1206. In an exemplary embodiment, the display 1208 is a liquid crystal display (LCD). FIG. 12 further shows that a keypad 1210 can be coupled to the DSP 1204.

As further depicted in FIG. 12, a flash memory 1212 can be coupled to the DSP 1204. A synchronous dynamic random access memory (SDRAM) 1214, a static random access memory (SRAM) 1216, and an electrically erasable programmable read only memory (EEPROM) 1218 can also be coupled to the DSP 1204. FIG. 12 also shows that a light emitting diode (LED) 1220 can be coupled to the DSP 1204. Additionally, in a particular embodiment, a voice CODEC 1222 can be coupled to the DSP 1204. An amplifier 1224 can be coupled to the voice CODEC 1222 and a mono speaker 1226 can be coupled to the amplifier 1224. FIG. 12 further indicates that a mono headset 1228 can also be coupled to the voice CODEC 1222. In a particular embodiment, the mono headset 1228 includes a microphone.

FIG. 12 also illustrates that a wireless local area network (WLAN) baseband processor 1230 can be coupled to the DSP 1204. An RF transceiver 1232 can be coupled to the WLAN baseband processor 1230 and an RF antenna 1234 can be coupled to the RF transceiver 1232. In a particular embodiment, a Bluetooth controller 1236 can also be coupled to the DSP 1204 and a Bluetooth antenna 1238 can be coupled to the controller 1236. FIG. 12 also shows that a USB port 1240 can also be coupled to the DSP 1204. Moreover, a power supply 1242 is coupled to the on-chip system 1202 and provides power to the various components of the wireless IP telephone 1200 via the on-chip system 1202.

In a particular embodiment, as indicated in FIG. 12, the display 1208, the keypad 1210, the LED 1220, the mono speaker 1226, the mono headset 1228, the RF antenna 1234, the Bluetooth antenna 1238, the USB port 1240, and the power supply 1242 are external to the on-chip system 1202. However, each of these components is coupled to one or more components of the on-chip system. Further, in a particular embodiment, the digital signal processor 1204 can use interleaved multithreading, as described herein, in order to process the various program threads associated with one or more of the different components associated with the IP telephone 1200.

Figure 13:
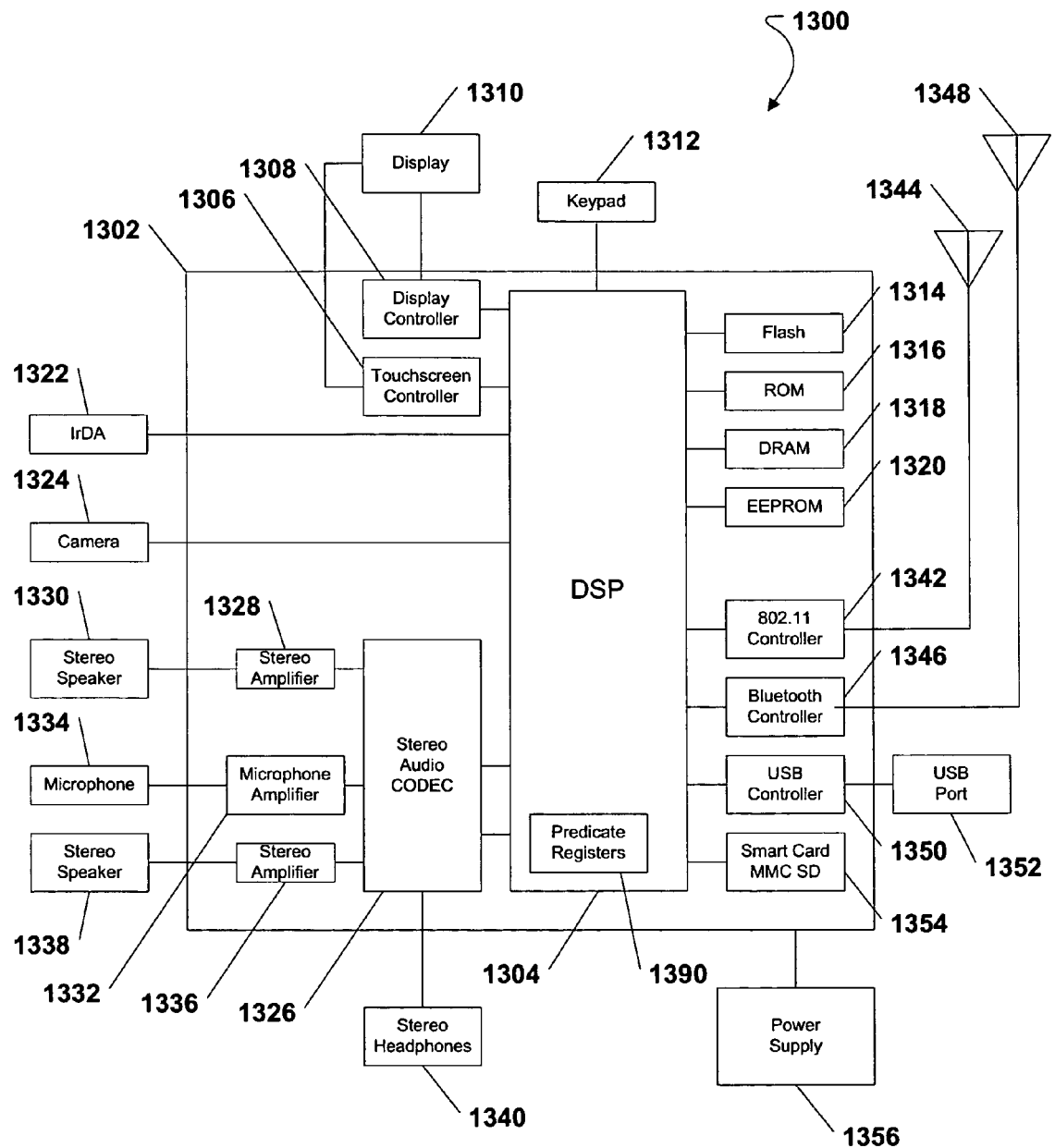
FIG. 13 is a block diagram of an exemplary portable digital assistant incorporating a digital signal processor.

FIG. 13 illustrates an exemplary, non-limiting embodiment of a portable digital assistant (PDA) that is generally designated 1300. As shown, the PDA 1300 includes an on-chip system 1302 that includes a digital signal processor (DSP) 1304. In a particular embodiment, the DSP 1304 is the processor shown in FIG. 1 and described herein. As illustrated in FIG. 13, the DSP 1304 includes a combined predicate register 1390 for scalar operations and vector operations. In a particular embodiment, compare operations store results in the combined predicate register 1390 and conditional operations use the stored compare results as conditional bits, e.g. in a vector MUX instruction as described above. As depicted in FIG. 13, a touchscreen controller 1306 and a display controller 1308 are coupled to the DSP 1304. Further, a touchscreen display is coupled to the touchscreen controller 1306 and to the display controller 1308. FIG. 13 also indicates that a keypad 1312 can be coupled to the DSP 1304.

As further depicted in FIG. 13, a flash memory 1314 can be coupled to the DSP 1304. Also, a read only memory (ROM) 1316, a dynamic random access memory (DRAM) 1318, and an electrically erasable programmable read only memory (EEPROM) 1320 can be coupled to the DSP 1304. FIG. 13 also shows that an infrared data association (IrDA) port 1322 can be coupled to the DSP 1304. Additionally, in a particular embodiment, a digital camera 1324 can be coupled to the DSP 1304.

As shown in FIG. 13, in a particular embodiment, a stereo audio CODEC 1326 can be coupled to the DSP 1304. A first stereo amplifier 1328 can be coupled to the stereo audio CODEC 1326 and a first stereo speaker 1330 can be coupled to the first stereo amplifier 1328. Additionally, a microphone amplifier 1332 can be coupled to the stereo audio CODEC 1326 and a microphone 1334 can be coupled to the microphone amplifier 1332. FIG. 13 further shows that a second stereo amplifier 1336 can be coupled to the stereo audio CODEC 1326 and a second stereo speaker 1338 can be coupled to the second stereo amplifier 1336. In a particular embodiment, stereo headphones 1340 can also be coupled to the stereo audio CODEC 1326.

FIG. 13 also illustrates that an 802.11 controller 1342 can be coupled to the DSP 1304 and an 802.11 antenna 1344 can be coupled to the 802.11 controller 1342. Moreover, a Bluetooth controller 1346 can be coupled to the DSP 1304 and a Bluetooth antenna 1348 can be coupled to the Bluetooth controller 1346. As depicted in FIG. 13, a USB controller 1350 can be coupled to the DSP 1304 and a USB port 1352 can be coupled to the USB controller 1350. Additionally, a smart card 1354, e.g., a multimedia card (MMC) or a secure digital card (SD) can be coupled to the DSP 1304. Further, as shown in FIG. 13, a power supply 1356 can be coupled to the on-chip system 1302 and can provide power to the various components of the PDA 1300 via the on-chip system 1302.

In a particular embodiment, as indicated in FIG. 13, the display 1310, the keypad 1312, the IrDA port 1322, the digital camera 1324, the first stereo speaker 1330, the microphone 1334, the second stereo speaker 1338, the stereo headphones 1340, the 802.11 antenna 1344, the Bluetooth antenna 1348, the USB port 1352, and the power supply 1350 are external to the on-chip system 1302. However, each of these components is coupled to one or more components on the on-chip system. Additionally, in a particular embodiment, the digital signal processor 1304 can use interleaved multithreading, described herein, in order to process the various program threads associated with one or more of the different components associated with the portable digital assistant 1300.

Figure 14:
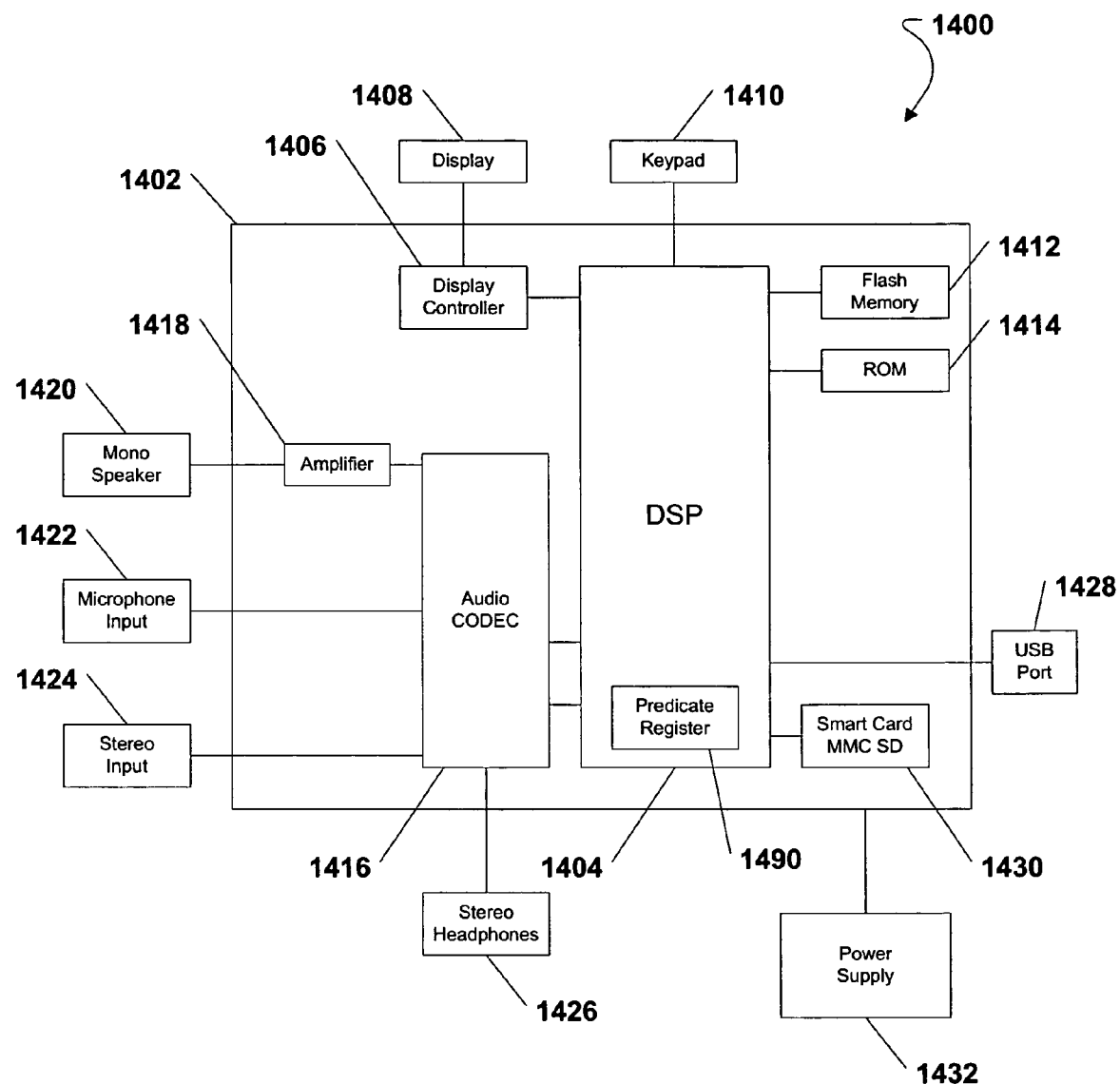
FIG. 14 is a block diagram of an exemplary audio file player incorporating a digital signal processor.

Referring to FIG. 14, an exemplary, non-limiting embodiment of an audio file player, such as moving pictures experts group audio layer-3 (MP3) player is shown and is generally designated 1400. As shown, the audio file player 1400 includes an on-chip system 1402 that includes a digital signal processor (DSP) 1404. In a particular embodiment, the DSP 1404 is the processor shown in FIG. 1 and described herein. As illustrated in FIG. 14, the DSP 1404 includes a combined predicate register 1490 for scalar operations and vector operations. In a particular embodiment, compare operations store results in the combined predicate register 1490 and conditional operations use the stored compare results as conditional bits, e.g. in a vector MUX instruction as described above. As illustrated in FIG. 14, a display controller 1406 is coupled to the DSP 1404 and a display 1408 is coupled to the display controller 1406. In an exemplary embodiment, the display 1408 is a liquid crystal display (LCD). FIG. 14 further shows that a keypad 1410 can be coupled to the DSP 1404.

As further depicted in FIG. 14, a flash memory 1412 and a read only memory (ROM) 1414 can be coupled to the DSP 1404. Additionally, in a particular embodiment, an audio CODEC 1416 can be coupled to the DSP 1404. An amplifier 1418 can be coupled to the audio CODEC 1416 and a mono speaker 1420 can be coupled to the amplifier 1418. FIG. 14 further indicates that a microphone input 1422 and a stereo input 1424 can also be coupled to the audio CODEC 1416. In a particular embodiment, stereo headphones 1426 can also be coupled to the audio CODEC 1416.

FIG. 14 also indicates that a USB port 1428 and a smart card 1430 can be coupled to the DSP 1404. Additionally, a power supply 1432 can be coupled to the on-chip system 1402 and can provide power to the various components of the audio file player 1400 via the on-chip system 1402.

In a particular embodiment, as indicated in FIG. 14, the display 1408, the keypad 1410, the mono speaker 1420, the microphone input 1422, the stereo input 1424, the stereo headphones 1426, the USB port 1428, and the power supply 1432 are external to the on-chip system 1402. However, each of these components is coupled to one or more components on the on-chip system. Also, in a particular embodiment, the digital signal processor 1404 can use interleaved multithreading, described herein, in order to process the various program threads associated with one or more of the different components associated with the audio file player 1400.

The systems and methods described herein provide reduced complexity, cost, and power usage. For instance, having the same predicate register operate for both scalar and vector operations reduces the cost and complexity of the processor by reducing the number of predicate registers needed. Also, having a separate predicate register file, rather than using general registers, reduces the cost, complexity, and power consumed of the processor. In addition the systems and methods described herein provide improved performance.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A processor device comprising:
a control register including a combined condition code register for scalar and vector operations;
a plurality of instruction execution units to execute scalar and vector instructions that utilize the combined condition code register, wherein the plurality of execution units use a vector multiplexer to selectively swap source operands to support signed and unsigned vector comparisons including compare-for-equal, compare-for-signed-for, and compared-for-unsigned-greater-than instructions;
a memory unit;
a sequencer responsive to the memory unit;
wherein the plurality of instruction execution units are responsive to the sequencer;
wherein the sequencer is adapted to fetch a plurality of instructions from the memory unit and to group the plurality of instructions into packets of instructions of different types to be executed in parallel by the plurality of instruction execution units;
wherein the memory unit includes an instruction for a scalar operation that utilizes the combined condition code register and an instruction for a vector operation that utilizes the combined condition code register; and
wherein the scalar operation is a scalar compare that sets each bit in a predicate register as a first value for a true compare and that sets each bit in the predicate register as a second value for a false compare.

2. The processor of claim 1, further comprising four 8-bit combined condition code registers for scalar and vector operations.

3. The processor of claim 2, wherein multithreading is utilized to process instructions associated with program threads to perform concurrent operations.

4. The processor of claim 2, wherein pipelining is utilized to process instructions.

5. The processor of claim 2, wherein the at least one instruction execution unit performs operations on bytes, half words, words, and double words.

6. The processor of claim 1, wherein the scalar operation is conditionally executed based on the combined condition code register.

7. The processor of claim 1, wherein the scalar operation uses the combined condition code register as an input.

8. The processor of claim 1, wherein a vector operation is conditionally executed based on the combined condition code register.

9. The processor of claim 1, wherein a vector compare operation uses the combined condition code register to store a result of a vector compare operation.

10. The processor of claim 9, wherein the vector operation is a 64-bit vector multiplexer instruction and the combined condition code register is an 8-bit register.

11. The processor of claim 1, wherein the vector operation is a word comparison operation that replicates each element result to four combined condition code register bits.

12. The processor of claim 1, wherein instructions for a vector operation can be used in place of looped algorithms.

13. The processor of claim 1, wherein the control register includes loop registers, modifier registers, a user status register, a program counter register, and a user general pointer register.

14. The processor of claim 1, wherein the first value is one and the second value is zero.

15. The processor of claim 1, wherein the plurality of execution units perform signed and unsigned comparisons by swapping operands and using both senses of a result obtained from comparison of the operands.

16. A method of processing data comprising:
performing a fetch of a plurality of instructions from a memory unit;
grouping the plurality of instructions into packets of instructions of different types for parallel execution by a plurality of instruction execution units, the packets of instructions including a first instruction and a second instruction;
executing the first instruction for a compare operation using a combined scalar and vector condition code register;
executing the second instruction for a conditional operation using the combined scalar and vector condition code register;
when the compare operation is a scalar compare operation, receiving a scalar compare instruction for the scalar compare operation at an instruction executing unit and storing results of the scalar compare operation in the combined scalar and vector condition code register, wherein a first value is stored in each bit of the combined scalar and vector condition code register for a true compare and a second value is stored in each bit of the combined scalar and vector condition code register for a false compare; and
when the compare operation is a vector compare operation performable by one of the plurality of execution units configured to perform signed and unsigned comparisons by swapping operands, outputting results obtained from a comparison of the operands.

17. The method of claim 16, wherein the conditional operation is a scalar conditional operation.

18. The method of claim 17, further comprising:
receiving an instruction for a scalar conditional operation at an instruction execution unit;
evaluating at least one condition code bit from the combined scalar and vector condition code register;
determining if the instruction for the scalar conditional operation should execute; and
depending upon the determination, storing the results of the scalar conditional operation in a register.

19. The method of claim 16, further comprising:
i. receiving an instruction for a vector compare operation at an instruction execution unit; and
ii. storing the results of the vector compare operation in the combined scalar and vector condition code register.

20. The method of claim 16, wherein the conditional operation is a vector conditional operation.

21. The method of claim 20, further comprising:
receiving an instruction for a vector conditional operation at an instruction execution unit;
utilizing at least one condition code bit from the combined scalar and vector condition code register, wherein the utilized bit is used in the vector conditional operation; and
storing the results of the vector conditional operation in a register.

22. The method of claim 16, the plurality of execution units are configured to perform signed and unsigned comparisons using any of a compare-for-equal comparison, a compare-for-signed-greater-than comparison, and a compare-for-unsigned-greater-than comparison.

23. An instruction set for a processor comprising:
an instruction for performing a scalar operation using a combined condition code register;
an instruction for performing a vector operation using the combined condition code register;
an instruction for fetching a plurality of instructions and issuing the plurality of instructions in parallel to a plurality of instruction execution units;
an instruction for grouping instructions of the plurality of instructions for parallel execution into packets of instructions of different types;
when the instruction for performing the scalar operation is a scalar compare instruction, the scalar compare instruction results in storing a first value in each bit of the combined condition code register for a true compare and storing a second value in each bit of the combined condition code register for a false compare; and
when the instruction for performing the vector operation is a vector compare instruction, the vector compare instruction is configured to swap operands to perform a plurality of signed and unsigned comparisons.

24. The instruction set of claim 23 wherein the instruction for performing the scalar operation is a scalar conditional operation.

25. The instruction set of claim 23 wherein the instruction for performing the vector operation is a vector conditional operation.

26. The instruction set of claim 23, wherein the plurality of signed and unsigned comparisons includes a compare-for-equal comparison, a compare-for-signed-greater-than comparison, and a compare-for-unsigned-greater-than comparison.

27. A processor comprising:
a combined condition code register for scalar and vector operations; and
an execution unit to execute a vector multiplexer operation that is suitable for scalar and vector conditional operations, the vector multiplexer operation enabling source operands of the vector multiplexer operation to be swapped to form results of a comparison of the source operands;
wherein the vector multiplexer operation is executable to perform an element-wise byte selection between two vector registers.

28. A wireless communication device, comprising:
an antenna;
a transceiver operably connected to the antenna;
a memory unit; and
a digital signal processor coupled to the memory unit and responsive to the transceiver;
wherein the digital signal processor includes:
a control register including a combined condition code register for scalar and vector operations;
a plurality of instruction execution units to execute scalar and vector instructions that utilize the combined condition code register, including:
a scalar compare instruction execution unit that stores a first value in each bit of the combined condition code register for a true compare and stores a second value in each bit of the combined condition code register for a false compare; and
a vector compare instruction execution unit that enables register operands to be swapped to generate signed and unsigned comparisons of the operands;
a sequencer responsive to the memory unit;
wherein the plurality of instruction execution units are responsive to the sequencer; and
wherein the sequencer is adapted to fetch a plurality of instructions from the memory unit and to group the plurality of instructions into packets of instructions of different types for parallel execution by the plurality of instruction execution units.

29. The wireless communication device of claim 28, further comprising:
a voice coder/decoder (CODEC) coupled to the digital signal processor;
a Bluetooth controller coupled to the digital signal processor;
a Bluetooth antenna coupled to the Bluetooth controller; and
a wireless local area network media access control (WLAN MAC) baseband processor coupled to the digital signal processor.

30. The wireless communication device of claim 28, further comprising:
a stereo coder/decoder (CODEC) coupled to the digital signal processor;
an 802.11 controller coupled to the digital signal processor;
an 802.11 antenna coupled to the 802.11 controller;
a Bluetooth controller coupled to the digital signal processor;
a Bluetooth antenna coupled to the Bluetooth controller;
a universal serial bus (USB) controller coupled to the digital signal processor; and
a USB port coupled to the USB controller.

31. An audio file player, comprising:
a digital signal processor;
an audio coder/decoder (CODEC) coupled to the digital signal processor;
a multimedia card coupled to the digital signal processor;

a universal serial bus (USB) port coupled to the digital signal processor; and wherein the digital signal processor includes:

a control register including a combined condition code register for scalar and vector operations;

a plurality of instruction execution units to execute scalar and vector instructions that both utilize the combined condition code register, including:

a scalar compare instruction execution unit that stores a first value in each bit of the combined condition code register for a true compare and stores a second value in each bit of the combined condition code register for a false compare; and a vector compare instruction execution unit that enables register operands to be swapped to generate signed and unsigned comparisons of the operands;

a memory unit;

a sequencer responsive to the memory unit;

wherein the plurality of instruction execution units are responsive to the sequencer; and wherein the sequencer is adapted to fetch a plurality of instructions from the memory unit and to group the plurality of instructions into packets of instructions of different types for parallel execution by the plurality of instruction execution units.

32. A processor device comprising:

means for executing an instruction for performing a scalar operation that utilizes a combined condition code register, including means for storing a first value in each bit of the combined condition code register when the scalar operation is a true scalar compare, and means for storing a second value in each bit of the combined condition code register when the scalar operation is a false scalar compare;

means for executing an instruction for performing a vector operation that utilizes the combined condition code register and that enables source operands of vector multiplexer (MUX) operations to be swapped to generate signed and unsigned comparisons of the operands; and means for grouping a plurality of instructions for parallel execution into packets of instructions of different types.

* * * * *